United States Patent [19]

Snider

[11] Patent Number: 5,403,022

[45] Date of Patent: Apr. 4, 1995

[54] CARRIAGE FOR A JUVENILE CAR SEAT

[76] Inventor: Richard C. Snider, 130 N. River Dr., Pennsville, N.J. 08070

[21] Appl. No.: 95,247

[22] Filed: Jul. 22, 1993

[51] Int. Cl.⁶ .............................. B60E 5/00; B62B 7/12
[52] U.S. Cl. ........................................ 280/30; 280/39; 280/648; 280/43.17
[58] Field of Search ................... 280/30, 648, 39, 643, 280/43.17, 43.24, 47.4

[56] References Cited

U.S. PATENT DOCUMENTS

| | | |
|---|---|---|
| 2,509,103 | 5/1950 | Lewis et al. . |
| 2,587,688 | 3/1952 | Bosk .................................... 280/39 |
| 3,549,164 | 12/1970 | Raynor . |
| 3,563,601 | 2/1971 | Dickey . |
| 3,829,113 | 8/1974 | Epelbaum ............................ 280/30 |
| 4,274,644 | 6/1981 | Taylor .................................... 280/39 |
| 4,632,409 | 12/1986 | Hall et al. ........................ 280/648 X |
| 4,872,693 | 10/1989 | Kennel . |
| 4,874,182 | 10/1989 | Clark . |
| 4,946,180 | 8/1990 | Baer . |
| 4,989,888 | 2/1991 | Qureshi et al. . |
| 5,318,311 | 6/1994 | Bofill .................................... 280/30 |

FOREIGN PATENT DOCUMENTS 226398  8/1962  Austria ................................ 280/648

Primary Examiner—Brian L. Johnson
Attorney, Agent, or Firm—Robert A. Shack; Sean F. Sullivan; David L. Baker

[57] ABSTRACT

A carriage for the support and transport of a juvenile car seat, the carriage including a frame for attachment of the juvenile car seat thereto, the frame including a front cross member defining a front of the frame, a rear cross member defining a rear of the frame, and a pair of elongated side members defining opposing sides of the frame, each of the side members being connected to and extending from the front cross member to the rear cross member, and the pair of side members being spaced from one another by substantially the width of the frame, a handle member extending upward from the rear of the frame, a pair of rotatable wheel bearing shaft members, each of the rotatable wheel bearing shaft members having an elongated longitudinal axis, and one each of the rotatable wheel bearing shaft members extending along one each of the opposing sides of the frame, each of the rotatable wheel bearing shaft members being rotatable about its respective longitudinal axis, at least a pair of wheels attached to each of the rotatable wheel bearing shaft members, and a rotation mechanism for simultaneously rotating each of the rotatable wheel bearing shaft members about its respective longitudinal axis. Preferably, at least one of each of the pair of wheels mounted on each of the rotatable wheel bearing shaft members is a wheel having a reverse camber.

2 Claims, 3 Drawing Sheets

CARRIAGE FOR A JUVENILE CAR SEAT

BACKGROUND

1. Field of the Invention

The present invention relates to the field of carriages specifically adapted and designed to both support and convey a juvenile car seat.

2. Description of the Related Art

U.S. Pat. No. 4,874,182 relates to a stroller apparatus for converting a child's car seat having a supporting base into a mobile stroller unit.

U.S. Pat. No. 4,989,888 relates to a combination child restraint/stroller.

U.S. Pat. No. 4,946,180 relates to a child support apparatus for use as a safety car seat, stroller, high chair, and crib.

U.S. Pat. No. 4,872,693 relates to a combination stroller/infant seat.

U.S. Pat. No. 3,563,601 relates to an orthopedic device adapted for handling of a child confined within a Spigi cast or Frejka pillow splint.

SUMMARY OF THE INVENTION

In one aspect, the invention generally features a carriage for supporting and conveying a juvenile car seat, the carriage including: a substantially rectangular frame for supporting the juvenile car seat, the frame including: a pair of elongated side members; a front cross member interconnecting the pair of side members; and a rear cross member interconnecting the pair of side members; a pair of elongated wheel bearing shaft members; one each of the wheel bearing shaft members being disposed substantially adjacent one each of the pair of side members; the longitudinal axes of the wheel bearing shaft members being substantially aligned with the longitudinal axes of the side members; the wheel bearing shaft members being rotatable about the longitudinal axes thereof; a pair of wheels mounted on each of the wheel bearing shaft members; and a handle member extending outward from the rear cross member.

Preferably, the carriage additionally includes a rotation mechanism for simultaneously rotating each of the wheel bearing shaft members about the longitudinal axes thereof; at least one of each of the pair of wheels mounted on each of the wheel bearing shaft members includes a wheel having a reverse camber; and the rotation mechanism includes: a pair of rotatable gear shaft members extending between the front and rear cross members; a pair of gears, one each of the pair of gears being mounted on one each of the gear shaft members; the pair of gears being intermeshed with one another; a gear shaft lever extending from each of the gear shaft members; a wheel shaft lever extending from each of the wheel bearing shaft members; a linkage rod connecting one each of the gear shaft levers with one each of the wheel shaft levers; and mechanism for rotating at least one of the rotatable gear shaft members.

In another aspect, the invention generally features a carriage for the support and transport of a juvenile car seat, the carriage including: a frame for attachment of the juvenile car seat thereto, the frame including: a front cross member defining a front of the frame; a rear cross member defining a rear of the frame; and a pair of elongated side members defining opposing sides of the frame, each of the side members being connected to and extending from the front cross member to the rear cross member, and the pair of side members being spaced from one another by substantially the width of the frame; a handle member extending upward from the rear of the frame; a pair of rotatable wheel bearing shaft members, each of the rotatable wheel bearing shaft members having an elongated longitudinal axis, and one each of the rotatable wheel bearing shaft members extending along one each of the opposing sides of the frame; each of the rotatable wheel bearing shaft members being rotatable about its respective longitudinal axis; at least a pair of wheels attached to each of the rotatable wheel bearing shaft members; and a rotation mechanism for simultaneously rotating each of the rotatable wheel bearing shaft members about its respective longitudinal axis.

Preferably, at least one of each of the pair of wheels mounted on each of the rotatable wheel bearing shaft members includes a wheel having a reverse camber; and the rotation mechanism includes: a pair of rotatable gear shaft members extending between the front and rear cross members; a pair of gears, one each of the pair of gears being mounted on one each of the rotatable gear shaft members; the pair of gears being intermeshed with one another; a gear shaft lever extending from each of the rotatable gear shaft members; a wheel shaft lever extending from each of the rotatable wheel bearing shaft members; a linkage rod connecting one each of the gear shaft levers with one each of the wheel shaft levers; and a mechanism for rotating at least one of the rotatable gear shaft members.

In yet another aspect, the invention generally features a carriage for supporting and conveying a juvenile car seat, the carriage including: a substantially rectangular frame for supporting the juvenile car seat, the frame including: a pair of elongated side members; a front cross member interconnecting the pair of side members; and a rear cross member interconnecting the pair of side members; a pair of elongated wheel bearing shaft members; one each of the wheel bearing shaft members being disposed substantially adjacent one each of the pair of side members; the longitudinal axes of the wheel bearing shaft members being substantially aligned with the longitudinal axes of the side members; the wheel bearing shaft members being rotatable about the longitudinal axes thereof; a pair of wheels mounted on each of the wheel bearing shaft members; a handle member extending outward from the rear cross member; and a rotation mechanism for simultaneously rotating each of the wheel bearing shaft members about the longitudinal axes thereof, the rotation mechanism including: a pair of rotatable gear shaft members extending between the front and rear cross members; a pair of gears, one each of the pair of gears being mounted on one each of the gear shaft members; the pair of gears being intermeshed with one another; a gear shaft lever extending from each of the gear shaft members; a wheel shaft lever extending from each of the wheel bearing shaft members; a linkage rod connecting one each of the gear shaft levers with one each of the wheel shaft levers; and a mechanism for rotating at least one of the rotatable gear shaft members; wherein at least one of each of the pair of wheels mounted on each of the wheel bearing shaft members includes a wheel having a reverse camber.

One object of the present invention is the provision of a carriage that can both support and convey a juvenile car seat.

Another object of the invention is the provision of a carriage that is compatible with a great number of commercially available juvenile car seats.

A still further object of the invention is the provision of a carriage that can be easily moved in and out of a vehicle.

The invention will now be described by way of a particularly preferred embodiment, reference being made to the accompanying drawings, wherein:

DESCRIPTION OF THE PREFERRED EMBODIMENT

Figure 1:
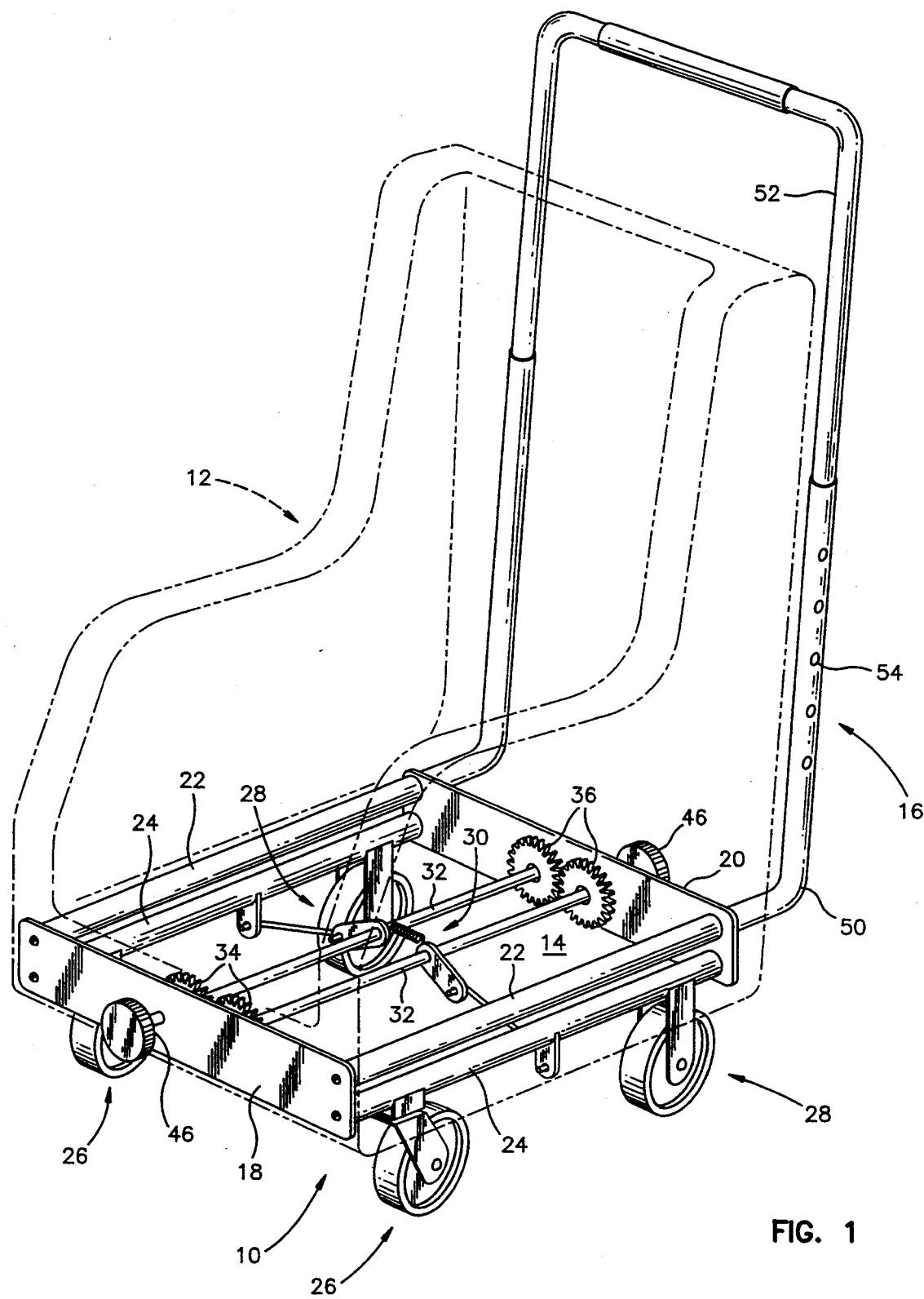
FIG. 1 is a perspective view of a carriage for supporting and conveying a juvenile car seat constructed according to the invention.

Referring initially to FIG. 1, a carriage 10 for supporting and conveying a juvenile car seat 12 generally includes a substantially rectangular frame portion 14 for supporting the car seat 12 and a handle portion 16 for propelling the carriage 10.

Figure 2:
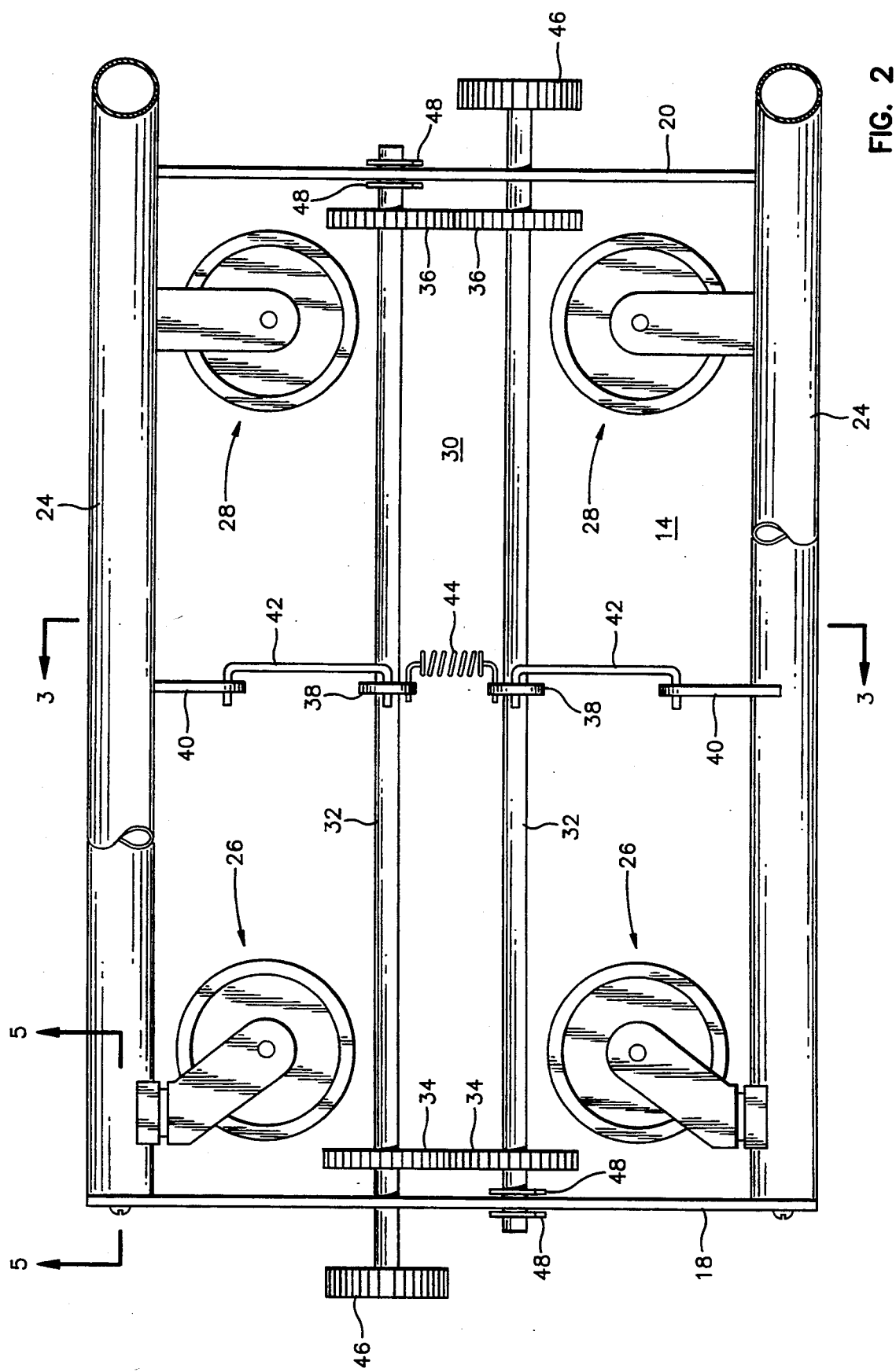
FIG. 2 is a partial bottom plan view of the inventive carriage of FIG. 1.

As seen most clearly in FIGS. 1 and 2, the frame 14 includes a front cross member 18, a rear cross member 20, and a pair of side members 22 that interconnect the front and rear cross members 18 and 20. Additionally, the frame 14 includes a pair of wheel bearing shafts 24 that are longitudinally aligned with and located beneath the side members 22. Each of the wheel bearing shafts 24 is rotatably mounted to permit rotation about its longitudinal axes and is provided with at least two wheel assemblies 26 and 28 mounted thereon. Due to the rotational movement of the wheel bearing shafts 24, the wheel assemblies 26 and 28 may be either positioned such that they project downward, as shown in FIG. 1, or such that they are retracted into and project inward toward the center of the frame 14, as shown in FIG. 2. The movement of the wheel assemblies 26 and 28 between these two positions is facilitated by the provision of a rotation mechanism 30 for rotating the wheel bearing shafts 24, preferably constructed as described below.

Figure 3:
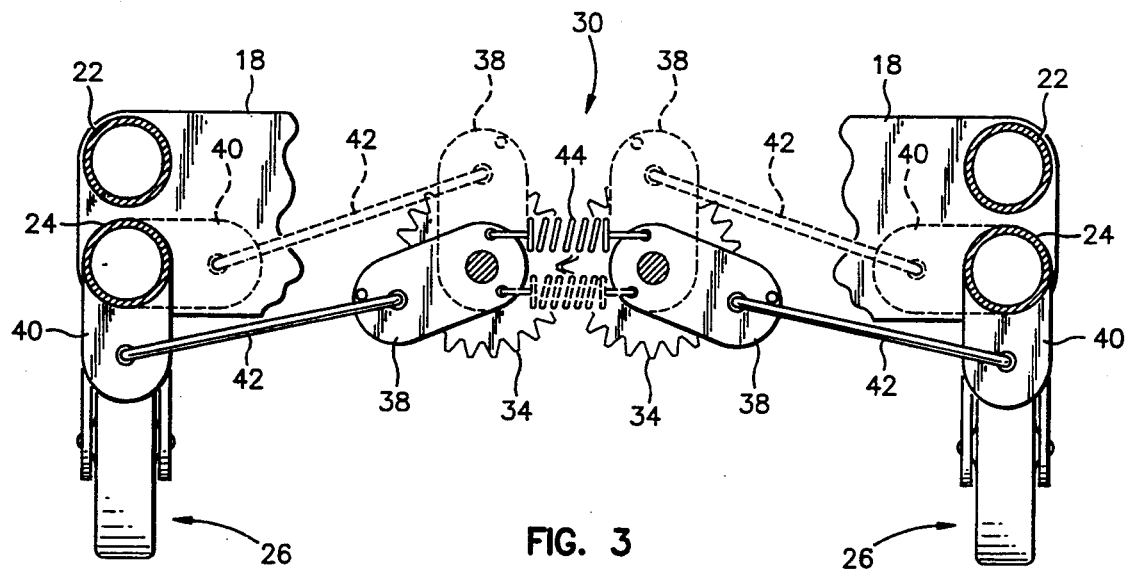
FIG. 3 is a back sectional view of the carriage, along the lines indicated in FIG. 2, showing the wheels of the stroller in an extended configuration.

Referring now most particularly to FIGS. 2 and 3, the rotation mechanism 30 is positioned within the frame 14 and generally includes a pair of rotatable gear shafts 32 extending between the front and rear cross members 18 and 20 and rotatably mounted therein, two pairs of intermeshing gears 34 and 36, one each of the pair of gears 34 and the pair of gears 36 being mounted on one each of the gear shafts 32, a gear shaft lever 38 extending outward from each of the gear shafts 32, a wheel shaft lever 40 extending outward from each of the wheel bearing shafts 24, and a linkage rod 42 interconnecting one each of the gear shaft levers 38 with one each of the wheel shaft levers 40. Additionally, the rotation mechanism 30 further includes a spring 44 for biasing the linkage rods 42 toward one another, a pair of adjustment knobs 46, and C-shaped retaining clips 48 for retaining the gear shafts 32 within the front and rear cross members 18 and 20.

Figure 4:
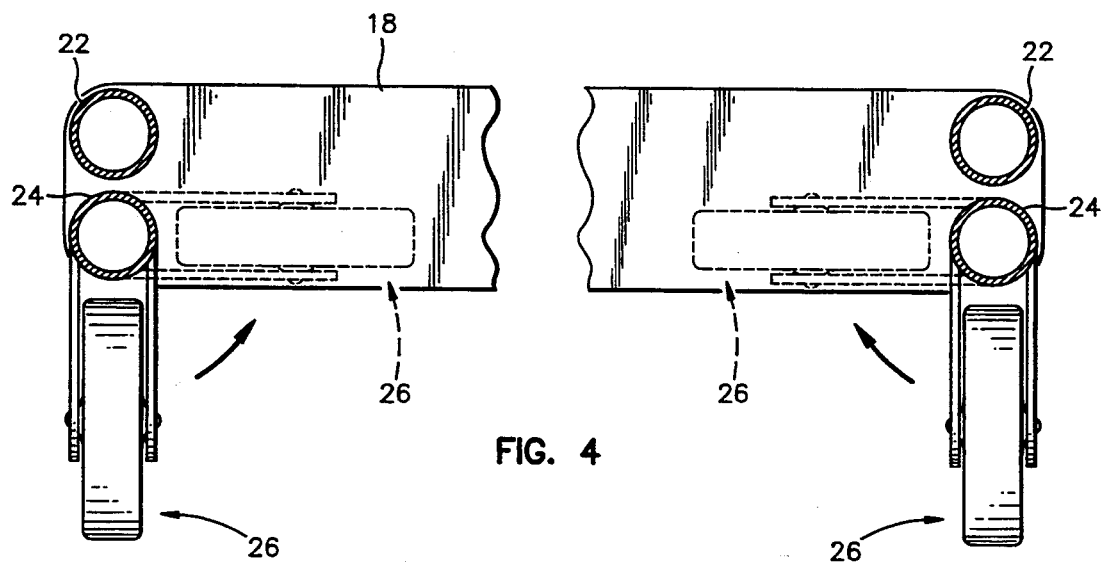
FIG. 4 is another back sectional view of the carriage, showing the wheels in a retracted configuration.

Due to the intermeshing of the pairs of gears 34 and 36, rotation of either of the adjustment knobs 46 causes a corresponding counter rotation of the pair of gear shafts 32 and a movement of the wheel assemblies 26 between the extended and retracted positions, as illustrated in FIGS. 3 and 4. Due to the biasing action of the spring 44, the wheel assemblies 26 and 28 are biased toward the retracted position.

Preferably, as shown in the drawings, at least the front wheel assemblies 26 are provided with a reverse camber such that they are "self steering".

Additionally, the handle portion 16 is preferably extendable and collapsible due to the provision of two telescoping handle members 50 and 52, the length of the handle portion 16 being adjustable via a length adjustment mechanism 54 of a type well known in the art.

Figure 5:
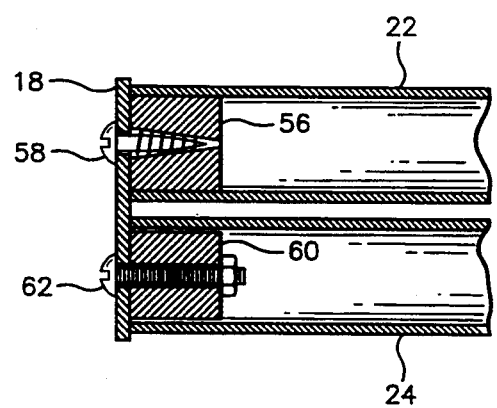
FIG. 5 is a sectional view of a construction detail of the manner of attachment of a frame corner of the carriage.

Referring now to FIG. 5, at each of the front corners of the frame portion 14, the front cross piece 18 is attached to each of the side members 22 by an expandable bushing 56 positioned within the side members 22 and by a screw 58 that passes through the front cross piece 18 and into the expandable bushing 56. Additionally, a nonexpandable bushing 60 is positioned within each of the wheel bearing shafts 24, and a bolt and nut 62 passes through the front cross piece 18 and into each of the nonexpandable bushings 60, thereby furnishing each of the wheel bearing shafts 24 with rotational movement about their longitudinal axes.

While the invention has been herein described by way of a particular preferred embodiment, various substitutions of equivalents may be effected without departing from the spirit and scope of the invention as set forth in the following claims.

What is claimed is:

1. A carriage for the support and transport of a juvenile car seat, said carriage comprising:
   a frame for attachment of the juvenile car seat thereto, said frame comprising:
   a front cross member defining a front of said frame;
   a rear cross member defining a rear of said frame; and
   a pair of elongated side members defining opposing sides of said frame, each of said side members being connected to and extending from said front cross member to said rear cross member, and said pair of side members being spaced from one another by substantially the width of said frame;
   a handle member extending upward from said rear of said frame;
   a pair of rotatable wheel bearing shaft members, each of said rotatable wheel bearing shaft members having an elongated longitudinal axis, and one each of said rotatable wheel bearing shaft members extending along one each of said opposing sides of said frame;
   each of said rotatable wheel bearing shaft members being rotatable about their respective longitudinal axes;
   at least a pair of wheels attached to each of said rotatable wheel bearing shaft members; and
   rotation means for simultaneously rotating each of said rotatable wheel bearing shaft members about their respective longitudinal axes, wherein said rotating means comprises:
   a pair of rotatable gear shaft members extending between said front and rear cross members;

a pair of gears, one each of said pair of gears being mounted on one each of said rotatable gear shaft members;

said pair of gears being intermeshed with one another;

a gear shaft lever extending from each of said rotatable gear shaft members;

a wheel shaft lever extending from each of said rotatable wheel bearing shaft members;

a linkage rod connecting one each of said gear shaft levers with one each of said wheel shaft levers; and means for rotating at least one of said rotatable gear shaft members;

wherein at least one of each of said pair of wheels mounted on each of said wheel bearing shaft members comprises a wheel having a reverse camber.

2. A carriage for supporting and conveying a juvenile car seat, said carriage comprising:

a substantially rectangular frame for supporting said juvenile car seat, said frame comprising:

a pair of elongated side members;

a front cross member interconnecting said pair of side members; and a rear cross member interconnecting said pair of side members;

a pair of elongated wheel bearing shaft members;

one each of said wheel bearing shaft members being disposed substantially adjacent one each of said pair of side members;

the longitudinal axes of said wheel bearing shaft members being substantially aligned with the longitudinal axes of said side members;

said wheel bearing shaft members being rotatable about said longitudinal axes thereof;

a pair of wheels mounted on each of said wheel bearing shaft members;

a handle member extending outward from said rear cross member; and rotation means for simultaneously rotating each of said wheel bearing shaft members about said longitudinal axes thereof, said rotation means comprising:

a pair of rotatable gear shaft members extending between said front and rear cross members;

a pair of gears, one each of said pair of gears being mounted on one each of said gear shaft members;

said pair of gears being intermeshed with one another;

a gear shaft lever extending from each of said gear shaft members;

a wheel shaft lever extending from each of said wheel bearing shaft members;

a linkage rod connecting one each of said gear shaft levers with one each of said wheel shaft levers; and means for rotating at least one of said rotatable gear shaft members;

wherein at least one of each of said pair of wheels mounted on each of said wheel bearing shaft members comprises a wheel having a reverse camber.

* * * * *